United States Patent
Massari et al.

(10) Patent No.: US 11,708,468 B2
(45) Date of Patent: Jul. 25, 2023

(54) PROPYLENE TERPOLYMER

(71) Applicant: BASELL POLIOLEFINE ITALIA S.R.L., Milan (IT)

(72) Inventors: Paola Massari, Ferrara (IT); Claudio Cavalieri, Ferrara (IT); Caroline Cathelin, Ferrara (IT); Davide Tartari, Ferrara (IT); Marco Ciarafoni, Ferrara (IT); Roberto Pantaleoni, Ferrara (IT)

(73) Assignee: Basell Doliolefine Italia S.r.l., Milan (IT)

( * ) Notice: Subject to any disclaimer, the term of this patent is extended or adjusted under 35 U.S.C. 154(b) by 341 days.

(21) Appl. No.: 17/275,939

(22) PCT Filed: Sep. 4, 2019

(86) PCT No.: PCT/EP2019/073553
§ 371 (c)(1),
(2) Date: Mar. 12, 2021

(87) PCT Pub. No.: WO2020/057974
PCT Pub. Date: Mar. 26, 2020

(65) Prior Publication Data
US 2022/0033596 A1    Feb. 3, 2022

(30) Foreign Application Priority Data
Sep. 20, 2018   (EP) .................... 18195698

(51) Int. Cl.
| C08L 23/16 | (2006.01) |
| C08L 23/20 | (2006.01) |
| C08F 210/08 | (2006.01) |
| C08F 210/02 | (2006.01) |
| C08F 210/06 | (2006.01) |
| C08F 210/16 | (2006.01) |
| C08J 5/18 | (2006.01) |
| C08L 23/14 | (2006.01) |
| C08F 2/00 | (2006.01) |

(52) U.S. Cl.
CPC ............... *C08J 5/18* (2013.01); *C08L 23/14* (2013.01); *C08F 2/001* (2013.01); *C08F 210/02* (2013.01); *C08F 210/06* (2013.01); *C08F 210/08* (2013.01); *C08F 210/16* (2013.01); *C08J 2323/14* (2013.01); *C08J 2423/14* (2013.01); *C08L 23/16* (2013.01); *C08L 23/20* (2013.01); *C08L 2203/162* (2013.01); *C08L 2205/025* (2013.01)

(58) Field of Classification Search
None
See application file for complete search history.

(56) References Cited

U.S. PATENT DOCUMENTS

| 2007/0161747 A1 | 7/2007 | Maier et al. |
| 2015/0087770 A1* | 3/2015 | Marzolla ............ C08J 5/18 526/348.6 |
| 2020/0385556 A1* | 12/2020 | Gahleitner ............ C08F 210/06 |

FOREIGN PATENT DOCUMENTS

| CN | 101772376 A | 7/2010 |
| CN | 104995220 A | 10/2015 |
| CN | 105829438 A | 8/2016 |
| CN | 107921763 A | 4/2018 |
| EP | 45977 A2 | 2/1982 |
| EP | 361494 A2 | 4/1990 |
| EP | 728769 A1 | 8/1996 |
| EP | 1012195 A1 | 6/2000 |
| EP | 1272533 A1 | 1/2003 |
| WO | 00063261 A1 | 10/2000 |
| WO | 2009019169 A1 | 2/2009 |
| WO | 2015101593 A1 | 7/2015 |
| WO | 2016139163 A1 | 9/2016 |

OTHER PUBLICATIONS

International Search Report and Written Opinion dated Dec. 10, 2019 (dated Dec. 10, 2019) for Corresponding PCT/EP2019/073553.

* cited by examiner

Primary Examiner — Richard A Huhn

(57) ABSTRACT

A terpolymer compositions made from or containing:
A) From 80 wt % to 97 wt %; of a first propylene, ethylene, 1-butene terpolymer having:
  i) the content of ethylene derived units ranging from 0.5 wt % to 3.2 wt %;
  ii) the content of 1-butene derived units ranging from 7.2 wt % to 14.8 wt %; and
B) From 20 wt % to 3 wt %; of a second propylene, ethylene, 1-butene terpolymer having:
  i) the content of ethylene derived units ranging from 0.5 wt % to 3.2 wt %;
  ii) the content of 1-butene derived units ranging from 14.4 wt % to 26.5 wt %; and
the terpolymer composition having the melt flow rate, MFR, measured according to ISO 1133 at 230° C. with a load of 2.16 kg, ranging from 3.0 g/10 min to 20.0 g/10 min; the sum of the amounts of A) and B) being 100 wt %.

15 Claims, No Drawings

PROPYLENE TERPOLYMER

This application is the U.S. National Phase of PCT International Application PCT/EP2019/073553, filed Sep. 4, 2019, claiming benefit of priority to European Patent Application No. 18195698.8, filed Sep. 20, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a composition made from or containing a terpolymer of propylene, ethylene, and 1-butene.

BACKGROUND OF THE INVENTION

In some instances, propylene, ethylene and 1-butene terpolymers are used for obtaining films, including biaxially oriented polypropylene films (BOPP) for packaging of foodstuff. In some instances, the films have a good balance of processability ("machinability"), optical and mechanical properties.

SUMMARY OF THE INVENTION

In a general embodiment, the present disclosure provides a terpolymer composition made from or containing:
A) From 80 wt % to 97 wt %; of a first propylene, ethylene, 1-butene terpolymer having:
   i) the content of ethylene derived units ranging from 0.5 wt % to 3.2 wt %, based upon the total weight of the first terpolymer;
   ii) the content of 1-butene derived units ranging from 7.2 wt % to 14.8 wt %, based upon the total weight of the first terpolymer;
   iii) the xylene soluble fraction at 25° C. ranging from 7.2 wt % to 13.4 wt %, based upon the total weight of the first terpolymer;
   iv) the melting point determined by differential scanning calorimetry (DSC), according to ISO 11357-3, with a heating rate of 20° C./minute ranging from 123° C. to 138° C.;
   v) the $C^{13}$ NMR sequences EEE ranging from 0.16 mol % to 0.40 mol %; and
   vi) the melt flow rate, MFR, measured according to ISO 1133 at 230° C. with a load of 2.16 kg, ranging from 1.0 g/10 min to 20.0 g/10 min; and
B) From 20 wt % to 3 wt %; of a second propylene, ethylene, 1-butene terpolymer having:
   i) the content of ethylene derived units ranging from 0.5 wt % to 3.2 wt %, based upon the total weight of the second terpolymer;
   ii) the content of 1-butene derived units ranging from 14.4 wt % to 26.5 wt %, based upon the total weight of the second terpolymer; and
   iii) the xylene soluble fraction at 25° C. ranging from 38.2 wt % to 60.2 wt %, based upon the total weight of the second terpolymer;
wherein the content of 1-butene derived units of component A) is lower than the amount of the content of 1-butene derived units of component B); and
the terpolymer composition having the melt flow rate, MFR, measured according to ISO 1133 at 230° C. with a load of 2.16 kg, ranging from 3.0 g/10 min to 20.0 g/10 min; the sum of the amounts of A) and B) being 100 wt %.

DETAILED DESCRIPTION OF THE INVENTION

In some embodiments, the present disclosure provides a terpolymer composition made from or containing:
A) From 80 wt % to 97 wt %; alternatively from 83 wt % to 95 wt %; alternatively from 85 wt % to 93 wt % of a first propylene, ethylene, 1-butene terpolymer having:
   i) the content of ethylene derived units ranging from 0.5 wt % to 3.2 wt %; alternatively ranging from 0.7 wt % to 2.8 wt %; alternatively ranging from 0.9 wt % to 2.2 wt %, based upon the total weight of the first terpolymer;
   ii) the content of 1-butene derived units ranging from 7.2 wt % to 14.8 wt %; alternatively ranging from 8.3 wt % to 13.2 wt %; alternatively ranging from 9.5 wt % to 12.2 wt %, based upon the total weight of the first terpolymer;
   iii) the xylene soluble fraction at 25° C. ranging from 7.2 wt % to 13.4 wt %; alternatively ranging from 8.3 wt % to 12.2 wt %, based upon the total weight of the first terpolymer;
   iv) the melting point determined by differential scanning calorimetry (DSC), according to ISO 11357-3, with a heating rate of 20° C./minute ranging from 123° C. to 138° C.; alternatively ranging from 127° C. to 134° C.; alternatively ranging from 128° C. to 132° C.;
   v) the $C^{13}$ NMR sequences EEE ranging from 0.16 mol % to 0.40 mol %; alternatively ranging from 0.18 mol % to 0.35 mol %; alternatively ranging from 0.20 mol % to 0.30 mol %; and
   vi) the melt flow rate, MFR, measured according to ISO 1133 at 230° C. with a load of 2.16 kg, ranging from 1.0 g/10 min to 20.0 g/10 min; alternatively ranging from 3.0 g/10 min to 13.0 g/10 min; and
B) from 20 wt % to 3 wt %; alternatively from 17 wt % to 5 wt %; alternatively from 15 wt % to 7 wt % of a second propylene, ethylene, 1-butene terpolymer having:
   i) the content of ethylene derived units ranging from 0.5 wt % to 3.2 wt %; alternatively ranging from 0.7 wt % to 2.8 wt %; alternatively ranging from 0.9 wt % to 2.2 wt %, based upon the total weight of the second terpolymer;
   ii) the content of 1-butene derived units ranging from 14.4 wt % to 26.5 wt %; alternatively ranging from 16.6 wt % to 23.3 wt %; alternatively ranging from 17.6 wt % to 21.4 wt %, based upon the total weight of the second terpolymer; and
   iii) the xylene soluble fraction at 25° C. ranging from 38.2 wt % to 60.2 wt %; alternatively ranging from 40.3 wt % to 55.7 wt %; alternatively ranging from 42.1 wt % to 54.8 wt %, based upon the total weight of the second terpolymer;
wherein the content of 1-butene derived units of component A) is lower than the amount of the content of 1-butene derived units of component B); and
the terpolymer composition having the melt flow rate, MFR, measured according to ISO 1133 at 230° C. with a load of 2.16 kg, ranging from 3.0 g/10 min to 20.0 g/10 min; alternatively ranging from 4.0 g/10 min to 13.2 g/10 min; the sum of the amounts of A) and B) being 100 wt %.

As used herein, the term "terpolymer" refers to polymers containing three kinds of comonomers, such as propylene, ethylene and 1-butene.

In some embodiments, component A) of the terpolymer composition of the present disclosure has the $C^{13}$ NMR sequences EEE ranging from 0.16 mol % to 0.40 mol %. This value is obtained by a polymerizing process being carried out in a reactor having two interconnected polymerization zones, a riser and a downcomer, wherein growing polymer particles:

(a) flow through the first of the polymerization zones, the riser, under fast fluidization conditions in the presence of propylene ethylene and 1-butene;

(b) leave the riser and enter the second of the polymerization zones, the downcomer, through which the growing polymer particles flow downward in a densified form in the presence of propylene, ethylene and 1-butene, wherein the concentration of ethylene in the downcomer is higher than in the riser; and (c) leave the downcomer and are reintroduced into the riser, thereby establishing a circulation of polymer between the riser and the downcomer.

In the first polymerization zone (riser), fast fluidization conditions are established by feeding a gas mixture made from or containing one or more alpha-olefins at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In the second polymerization zone (downcomer), the polymer particles flow under the action of gravity in a densified form, thereby achieving high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In the downcomer, the polymer flows downward in a plug flow. In some embodiments, small quantities of gas are entrained with the polymer particles.

In some embodiments, the two interconnected polymerization zones are operated such that the gas mixture coming from the riser is totally or partially prevented from entering the downcomer by introducing into the upper part of the downcomer a liquid or gas stream, denominated "barrier stream", having a composition different from the gaseous mixture present in the riser. In some embodiments, one or more feeding lines for the barrier stream are placed in the downcomer close to the upper limit of the volume occupied by the polymer particles flowing downward in a densified form.

In some embodiments, this liquid/gas mixture fed into the upper part of the downcomer partially replaces the gas mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the gas mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer.

In some embodiments, the polymerization process and apparatus is as described in European Patent No. EP 1012195.

In some embodiments, the process for preparing the propylene ethylene 1-butene terpolymer component A) is carried out in presence of a highly stereospecific heterogeneous Ziegler-Natta catalyst. In some embodiments, the Ziegler-Natta catalysts are made from or contain a solid catalyst component made from or containing at least one titanium compound having a titanium-halogen bond and an electron-donor compound (internal donor), both supported on magnesium chloride. In some embodiments, the Ziegler-Natta catalysts systems are further made from or containing an organo-aluminum compound as a co-catalyst and optionally an external electron-donor compound.

In some embodiments, the catalysts systems are as described in the European Patent Nos. EP45977, EP361494, EP728769, EP 1272533 or Patent Cooperation Treaty Publication No. WO 00/63261.

In some embodiments, the propylene ethylene 1-butene terpolymer component B) is prepared in a gas phase process, alternatively in a fluidized bed gas phase process. In some embodiments, components A) and B) are prepared in a cascade process wherein component A) is prepared and then component B) is prepared in a gas phase reactor in the presence of component A), in the absence of additional catalyst.

In some embodiments, the terpolymer composition is used in the manufacture of films, alternatively in the manufacture of cast or biaxially-oriented polypropylene (BOPP) films. In some embodiments, the difference between the melting point of the terpolymer composition and the SIT is lower than 20° C., alternatively lower than 23° C., alternatively lower than 26° C.

In some embodiments, the haze measured on 50 µm cast film is lower than 0.7%, alternatively lower than 0.5%.

In some embodiments, the film is obtained from a terpolymer composition further made from or containing additives. In some embodiments, the films are for packaging applications. In some embodiments, the films are prepared with automatic machines. In some embodiments, the additives are selected from the group consisting of anti-oxidants, process stabilizers, slip agents, antistatic agents, antiblock agents, and antifog agents.

The following examples are given to illustrate, not to limit, the present disclosure:

EXAMPLES

Xylene-Soluble (XS) Fraction at 25° C.

Xylene Solubles at 25° C. are determined according to ISO 16152: 2005; with solution volume of 250 ml, precipitation at 25° C. for 20 minutes, including 10 minutes with the solution in agitation (magnetic stirrer), and drying at 70° C. The Fraction of xylene solubles of component b) was calculated according to the formula $XS_{tot}=X_sAW_A+X_sBW_B$;

wherein Xstot was the soluble xylene fraction of the overall composition, XsA was the soluble xylene fraction of component A, and WA was the amount of component A; XsB was the soluble xylene fraction of component B and WB was the amount of component B; wherein Wa+Wb=1.

Melt Flow Rate (MFR)

Measured according to ISO 1133 at 230° C. with a load of 2.16 kg, unless otherwise specified.

Determination of the Haze

Multilayer film specimens were prepared. The haze value was measured using a Gardner photometric unit connected to a Hazemeter type UX-10 or an equivalent instrument having G.E. 1209 light source with filter "C". Standard samples were used for calibrating the instrument according to ASTM D1003.

Determination of Ethylene and 1-Butene Content $^{13}$C NMR spectra were acquired on a Bruker AV600 spectrometer equipped with cryo probe, operating 150.91 MHz MHz in the Fourier transform mode at 120° C.

The peak of the $S_{\delta\delta}$ carbon (nomenclature according C. J. Carman, R. A. Harrington and C. E. Wilkes, Macromolecules, 10, 3, 536 (1977)) was used as internal standard at 29.9 ppm. About 30 mg of sample were dissolved in 0.5 ml of 1,1,2,2 tetrachloroethane $d_2$ at 120° C. w. Each spectrum was acquired with a 90° pulse, 15 seconds of delay between pulses and CPD to remove $^1$H-$^{13}$C coupling. 512 transients were stored in 65 K data points using a spectral window of 9000 Hz.

Triad distribution was obtained using the following relations:

$XPX=100I_8/\Sigma$ $XPE=100I_5/\Sigma$ $EPE=100I_4/\Sigma$ $XBX=100I_3/\Sigma$ $XBE=100I_2/\Sigma$ $XEX=100I_9/\Sigma$ $XEE=100I_1/\Sigma$ $EEE=100(0.5I_7+0.25I_6)/\Sigma$ Where $\Sigma=I_8+I_5+I_4+I_3+I_2+I_9+I_1+0.5I_7+0.25I_6$ I are the areas of the corresponding carbon as reported in Table a and X can be propylene or 1-butene The molar content of Ethylene, Propylene and 1-Butene was obtained from triads using the following relations:

$P(m\%)=XPX+XPE+EPE$ $B(m\%)=XBX+XBE+EBE$ $E(m\%)=EEE+XEE+XEX$

Molar content was transformed to weight using monomers' molecular weights.

TABLE A

Assignments of the $^{13}$C NMR spectrum of Ethylene/Propylene/1-Butene terpolymers

| Number | Chemical Shift (ppm) | Carbon | Sequence |
| --- | --- | --- | --- |
| 1 | 37.64-37.35 | $S_{\alpha\delta}$ | PEE |
| 2 | 37.35-37.15 | $T_{\beta\delta}$ | XBE |
| 3 | 35.27-34.92 | $T_{\beta\beta}$ | XBX |
| 4 | 33.29-33.15 | $T_{\delta\delta}$ | EPE |
| 5 | 30.93-30.77 | $T_{\beta\delta}$ | XPE |
| 6 | 30.35-30.26 | $S_{\gamma\delta}$ | PEEE |
| 7 | 29.97-29.85 | $S_{\delta\delta}$ | EEE |

TABLE A-continued

Assignments of the $^{13}$C NMR spectrum of Ethylene/Propylene/1-Butene terpolymers

| Number | Chemical Shift (ppm) | Carbon | Sequence |
| --- | --- | --- | --- |
| 8 | 29.14-28.31 | $T_{\beta\beta}$ | XPX |
| 9 | 24.88-24.14 | $S_{\beta\beta}$ | XEX |

Example 1 and Comparative Example 2

Procedure for the Preparation of the Spherical Adduct

Microspheroidal $MgCl_2 \cdot pC_2H_5OH$ adduct was prepared according to the method described in Comparative Example 5 of Patent Cooperation Treaty Publication No. WO98/44009, with the difference that $BiCl_3$ in a powder form and in the amount of 3 mol % with respect to the magnesium being added before feeding of the oil. The adduct contained 11.2 wt % of Mg.

Procedure for the Preparation of the Solid Catalyst Component

Into a 300 L jacketed reactor, equipped with a mechanical stirrer, a condenser and a thermocouple, 200 L of $TiCl_4$ were introduced at room temperature under nitrogen atmosphere. After cooling to 0° C., while stirring, diisobutylphthalate and 8 kg of the spherical adduct were sequentially added. The amount of charged internal donor was to meet a Mg/donor molar ratio of 8. The temperature was raised to 100° C. and maintained for 1 hour. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for ½ hour. Stirring was stopped again, the solid was allowed to settle and the supernatant liquid was siphoned off at 120° C. The treatment with $TiCl_4$ at 120° C. was then repeated with the exception that the treatment time was decreased to 15 minutes. The solid was washed with anhydrous hexane six times in temperature gradient down to 60° C. and one time at room temperature. The solid was then dried under vacuum.

Prepolymerization Treatment

Before introducing the solid catalyst component into the polymerization reactors, the solid catalyst component was contacted with triethyl aluminum (TEAL) and Dicyclopentyldimethoxysilane (DCPMS, D donor) in a ratio reported in Table 1. Then the mixture was subjected to prepolymerization suspending the mixture in liquid propylene at 20° C. for about 5 minutes before introducing the mixture into the polymerization reactor.

Polymerization

The polymerization was carried out in gas-phase polymerization reactor having two interconnected polymerization zones, a riser and a downcomer, as described in European Patent No. EP1012195. The two interconnected polymerization zones were operated such that the gas mixture coming from the riser was totally or partially prevented from entering the downcomer by introducing into the upper part of the downcomer a liquid or gas stream, denominated "barrier stream", having a composition different from the gaseous mixture present in the riser. A "barrier stream" was not used in comparative example 2.

The polymer produced in the first reactor was discharged in a continuous flow from the first reactor and introduced in a continuous flow into the second fluidized bed gas phase polymerization reactor, together with quantitatively constant flows of hydrogen (when used) 1-butene, ethylene and propylene in the gas state as reported in Table 1. Samples of the terpolymer of the first reactors were taken.

The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1.

TABLE 1

| Example | | Ex 1 | Comp Ex 2 |
|---|---|---|---|
| PRECONTACT | | | |
| Temperature | ° C. | 15 | 15 |
| Residence Time | min | 15 | 15 |
| TEAL/catalyst | wt/wt | 7 | 7 |
| TEAL/Ext. Donor | g/g | 20 | 20 |
| PREPOLYMERIZATION | | | |
| Temperature | ° C. | 20 | 20 |
| Residence Time | min | 8 | 8 |
| POLYMERIZATION Component A | | | |
| Temperature | bar-g | 67 | 67 |
| Pressure | bar-g | 22 | 22 |
| Residence Time | min | 118 | 121 |
| Split holdup riser | wt % | 30 | 30 |
| Split holdup downcomer | wt % | 70 | 70 |
| C2/C2⁻+ C3 riser | mol/mol | 0.007 | 0.013 |
| C2/C2⁻+ C3 downcomer | mol/mol | 0.013 | 0.008 |
| C4/C4⁻+ C3⁻ | mol/mol | 0.18 | 0.18 |
| H₂/C3 riser | mol/mol | 0.094 | 0.07 |
| Gas phase comp B | | | |
| Temperature | bar-g | 75 | 75 |
| Pressure | bar-g | 17 | 17 |
| Residence Time | min | 60 | 70 |
| H2/C3 | Mol/mol | 0.081 | 0.07 |
| C2/C2 + C3 | Mol/mol | 0.011 | 0.009 |
| C4/C4 + C3 | Mol/mol | 0.27 | 0.3 |

C2 = ethylene;
C3 = propylene:
C4 = 1-butene

The properties of the polymers of example 1 and comparative example 2 are reported in Table 2.

TABLE 2

| | | Comp ex 2 | Ex 1 |
|---|---|---|---|
| Component A | | | |
| MFR | g/10' | 6.2 | 5.5 |
| C2-% content | wt % | 1.1 | 1.2 |
| C4-% content (IR) | wt % | 9.7 | 9.8 |
| Xylene solubles (Xs) | wt % | 7.5 | 10.6 |
| Intrinsic viscosity of XS | | 1.08 | 1.48 |
| Tm | ° C. | 130.2 | 131.1 |
| EEE sequences | Mol % | 0.14 | 0.21 |
| SIT | ° C. | 106 | 107 |
| Haze | | 0.1 | 0.4 |
| Amount of component A | Wt % | 90 | 90 |
| Component B | | | |
| C2-% content | wt % | 1.2* | 1.2* |
| C4-% content (IR) | wt % | 22.7* | 21.8* |
| Xylene solubles (Xs) | wt % | 50* | 57* |
| Amount of component B | Wt % | 10 | 10 |
| Total composition | | | |
| MFR | g/10' | 7.1 | 6.0 |
| Tm | ° C. | 129.0 | 129.0 |
| SIT | ° C. | 105 | 103 |
| Tm-SIT | | 24 | 26 |
| Haze | % | 0.2 | 0.2 |

*calculated

What is claimed is:

1. A terpolymer composition comprising:
   A) from 80 wt % to 97 wt % of a first propylene, ethylene, 1-butene terpolymer having:
      i) a content of ethylene derived units ranging from 0.5 wt % to 3.2 wt %, based upon the total weight of the first terpolymer;
      ii) a content of 1-butene derived units ranging from 7.2 wt % to 14.8 wt %, based upon the total weight of the first terpolymer;
      iii) a xylene soluble fraction at 25° C. ranging from 7.2 wt % to 13.4 wt %, based upon the total weight of the first terpolymer;
      iv) a melting point determined by differential scanning calorimetry (DSC), according to ISO 11357-3, with a heating rate of 20° C./minute ranging from 123° C. to 138° C.;
      v) a content of $C^{13}$ NMR sequences EEE ranging from 0.16 mol % to 0.40 mol %; and
      vi) a melt flow rate, MFR, measured according to ISO 1133 at 230° C. with a load of 2.16 kg, ranging from 1.0 g/10 min to 20.0 g/10 min; and
   B) from 20 wt % to 3 wt % of a second propylene, ethylene, 1-butene terpolymer having:
      i) a content of ethylene derived units ranging from 0.5 wt % to 3.2 wt %, based upon the total weight of the second terpolymer;
      ii) a content of 1-butene derived units ranging from 14.4 wt % to 26.5 wt %, based upon the total weight of the second terpolymer; and
      iii) a xylene soluble fraction at 25° C. ranging from 38.2 wt % to 60.2 wt %, based upon the total weight of the second terpolymer;
   wherein the content of 1-butene derived units of component A) is lower than the content of 1-butene derived units of component B); and
   the terpolymer composition having a melt flow rate, MFR, measured according to ISO 1133 at 230° C. with a load of 2.16 kg, ranging from 3.0 g/10 min to 20.0 g/10 min; the sum of the amounts of A) and B) being 100 wt %.

2. The terpolymer composition according to claim 1 comprising from 83 wt % to 95 wt % of component A) and from 17 wt % to 5 wt % of component B).

3. The terpolymer composition according to claim 1, wherein in component A) the xylene soluble fraction at 25° C. ranges from 8.3 wt % to 13.2 wt %, based upon the total weight of the first terpolymer.

4. The terpolymer composition according to claim 1, wherein in component A) the melting point determined by differential scanning calorimetry (DSC), according to ISO 11357-3, with a heating rate of 20° C./minute ranges from 127° C. to 134° C.

5. The terpolymer composition according to claim 1, wherein in component A) the content of the $C^{13}$ NMR sequences EEE ranges from 0.18 mol % to 0.35 mol %.

6. The terpolymer composition according to claim 1, wherein in component A) the content of ethylene derived units ranges from 0.7 wt % to 2.8 wt %, based upon the total weight of the first terpolymer.

7. The terpolymer composition according to claim 1, wherein in component A) the content of 1-butene derived units ranges from 8.3 wt % to 13.2 wt %, based upon the total weight of the first terpolymer.

8. The terpolymer composition according to claim 1, wherein in component B) the content of ethylene derived units ranges from 0.7 wt % to 2.8 wt %, based upon the total weight of the second terpolymer.

9. The terpolymer composition according to claim 1, wherein in component B) the content of 1-butene derived units ranges from 16.6 wt % to 23.3 wt %, based upon the total weight of the second terpolymer.

10. The terpolymer composition according to claim 1, having the melt flow rate, MFR, measured according to ISO 1133 at 230° C. with a load of 2.16 kg, ranging from 4.0 g/10 min to 13.2 g/10 min.

11. The terpolymer composition according to claim 1, wherein in component A) the melt flow rate, MFR, measured according to ISO 1133 at 230° C. with a load of 2.16 kg, ranges from 3.0 g/10 min to 13.0 g/10 min.

12. The terpolymer composition according to claim 1, wherein in component A) the content of ethylene derived units ranges from 0.9 wt % to 2.2 wt %, based upon the total weight of the first terpolymer.

13. The terpolymer composition according to claim 1, wherein in component A) the content of 1-butene derived units ranges from 9.5 wt % to 12.2 wt %, based upon the total weight of the first terpolymer.

14. A film comprising the terpolymer composition of claim 1.

15. The film according to claim 14 being a BOPP film.

\* \* \* \* \*